(12) United States Patent
Nizhawan et al.

(10) Patent No.: US 10,616,228 B2
(45) Date of Patent: Apr. 7, 2020

(54) ENHANCED PERMISSIONS FOR ENABLING RE-PURPOSING OF RESOURCES WHILE MAINTAINING INTEGRITY

(71) Applicant: Adobe Inc., San Jose, CA (US)

(72) Inventors: Nitin Nizhawan, Delhi (IN); Mayank Gupta, Noida (IN)

(73) Assignee: Adobe Inc., San Jose, CA (US)

( * ) Notice: Subject to any disclaimer, the term of this patent is extended or adjusted under 35 U.S.C. 154(b) by 204 days.

(21) Appl. No.: 15/809,306

(22) Filed: Nov. 10, 2017

(65) Prior Publication Data

US 2019/0149546 A1 May 16, 2019

(51) Int. Cl.
G06F 7/04 (2006.01)
G06F 12/14 (2006.01)
G06F 21/62 (2013.01)
H04L 29/06 (2006.01)
G06F 21/50 (2013.01)
H04L 9/32 (2006.01)

(52) U.S. Cl.
CPC .............. H04L 63/10 (2013.01); G06F 21/50 (2013.01); H04L 63/101 (2013.01)

(58) Field of Classification Search
CPC ....... H04L 63/10; G06F 21/6218; G06F 9/543
See application file for complete search history.

(56) References Cited

U.S. PATENT DOCUMENTS

| | | | | |
|---|---|---|---|---|
| 8,769,063 B2 * | 7/2014 | Barton | ..................... | H04L 41/00 709/221 |
| 9,553,916 B2 * | 1/2017 | Ram | ....................... | H04L 67/06 |
| 2005/0008163 A1 * | 1/2005 | Leser | ........................ | H04L 9/08 380/281 |
| 2007/0011749 A1 * | 1/2007 | Allison | ............... | G06F 21/6209 726/26 |
| 2009/0025063 A1 * | 1/2009 | Thomas | .............. | G06F 21/6218 726/4 |
| 2009/0119772 A1 * | 5/2009 | Awad | .................. | G06F 21/6218 726/21 |
| 2009/0271580 A1 * | 10/2009 | Oe | ........................ | G06F 21/552 711/161 |
| 2016/0019104 A1 * | 1/2016 | Major | ................. | G06F 21/6218 719/319 |
| 2018/0335998 A1 * | 11/2018 | Callaghan | ............. | G06F 3/1454 |

OTHER PUBLICATIONS

Roesner, Franziska, et al. "User-driven access control: Rethinking permission granting in modern operating systems." 2012 IEEE Symposium on Security and Privacy. IEEE, 2012. (Year: 2012).*

* cited by examiner

*Primary Examiner* — Michael Simitoski
(74) *Attorney, Agent, or Firm* — Finch & Maloney PLLC

(57) ABSTRACT

Enhanced permission techniques are disclosed that ensures integrity of resources while the resources are provided for re-purposing by users that do not have conventional permissions, such as read or write permissions, to the resources. In some examples, a method to evaluate enhanced permissions for re-purposing a resource from a source path to a target path by a user may include evaluating source permissions and target permissions, and determining whether to allow the re-purposing the resource based on the evaluating. The source permissions are copy permissions or cut permissions specified for the source path and that apply to the user. The target permissions are paste permissions specified for the target path and that apply to the user.

20 Claims, 5 Drawing Sheets

ENHANCED PERMISSIONS FOR ENABLING RE-PURPOSING OF RESOURCES WHILE MAINTAINING INTEGRITY

FIELD OF THE DISCLOSURE

This disclosure relates generally to access authorization, and more particularly, to controlling access to a resource.

BACKGROUND

Content repositories allow for the management of resources (e.g., digital content) with an associated set of data management, search, and access methods that provide access to the resources. In this regard, access permissions are typically implemented in order to protect the resources from damage and/or unauthorized use. With respect to a content repository, an access control list (ACL) is a set or list of permissions attached to a resource in the content repository. An ACL specifies the users that are permitted to access the resources, as well as the operations that are permitted on the resources. Each entry in a typical ACL may specify a subject and an operation. For example, a system administrator may define an ACL for a resource so as to permit access to certain users or groups of users, as well as the operation or operations each user or group of users is permitted to perform on the resource.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

Figure 1:
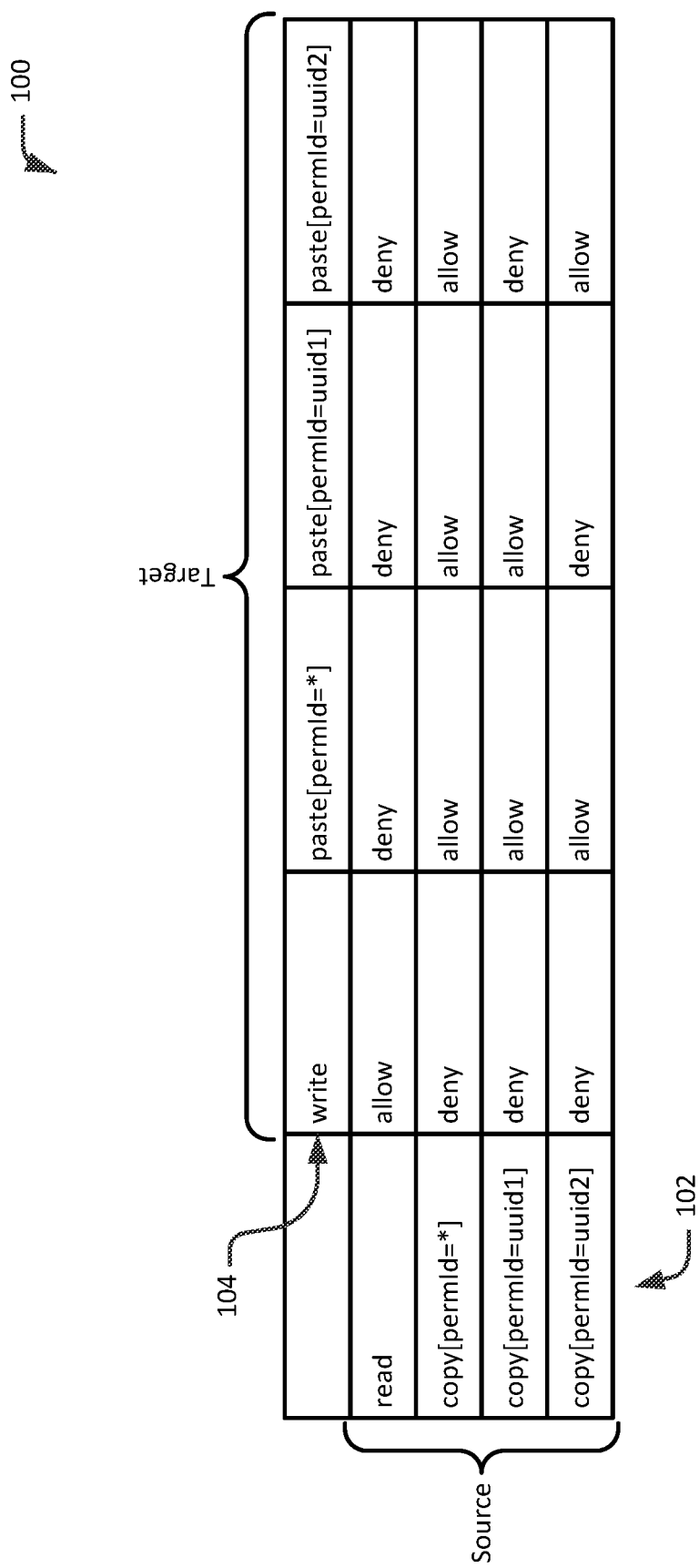
FIG. 1 illustrates an example table showing the permission evaluation of a copy operation, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Content repositories facilitate the storage and management of digital resources (interchangeably referred to herein as "resources"), such as files, scripts, folders, directories, and the like. Resources in a content repository may be managed by applying permissions to control an operation or operations performed on the resources. A permission is an authorization to perform an operation on a specified resource, such as a file, a folder, a directory, etc., in the content repository, and may be granted to a user or a group of users. Permissions can be granted by owners of the resources or by anyone with the permission to grant permissions, such as system administrators. Typically, when a permission to perform an operation is not explicitly granted, the permission is implicitly denied. Permissions may be stored as Access Control Entries (ACEs) in an ACL associated with a resource. However, conventional permissions, such as read and write permissions, may be insufficient in that the permissions fail to provide the necessary access to, and use of the resources in the content repository while ensuring the integrity of the resource. For example, the conventional read permission specified for a file typically grants the ability to read the contents of the file. When specified for a folder, the read permission grants the ability to read the names of the files in the folder, as well as the ability to read the contents of the files in the folder. The read permission does not grant the ability to copy or move files or folders, including the files in the folder, in the content repository. The conventional write permission specified for a file typically grants the ability to alter or modify the file, including the contents of the file. When specified for a folder, the write permission grants the ability to alter the contents of the folder, including the contents of the files in the folder. This includes creating new files in the folder, modifying the files in the folder, deleting files from the folder, and renaming the files in the folder. The write permission grants the ability to copy or move files and folders, including the files in the folders, in the content repository.

In an example use case of the read and write permissions, a system administrator may have defined two groups, a "Group 1" and a "Group 2", for a content repository. The system administrator may have granted users of Group 1 write permissions, which allows the users in Group 1 to create and modify resources, such as files and folders, in the content repository. As a result, users of Group 1 are able to re-purpose (e.g., copy, move, use) the resources in the content repository. For example, users of Group 1 may be users that are trusted to not jeopardize the integrity of the content repository, including the resources in the content repository. In contrast, the system administrator may have granted users of Group 2 only read permissions and not write permissions. Without write permissions, users of Group 2 are not allowed to create and modify resources in the content repository. As a result, users of Group 2 are not able to re-purpose resources in the content repository. For example, users of Group 2 may be users that are not as trusted as the users of Group 1. In this instance, to allow users of Group 2 to re-purpose resources in the content repository, including re-purposing resources created by users of Group 1, the system administrator will need to grant users of Group 2 write permissions. But, granting write permissions to users of Group 2 to allow the users of Group 2 to re-purpose resources created by users of Group 1 will also allow users of Group 2 to create and modify resources in the content repository. Unfortunately, this can lead to undesirable consequences. For example, users of Group 2 that are untrained, ill-advised, or simply malicious, can create resources and/or modify resources in a manner that jeopardizes the integrity of the content repository, including the resources in the content repository. This can lead to security issues as well as increased costs in the management of the content repository.

As illustrated by the example above, conventional permissions suffer from certain shortcomings, disadvantages, and other challenges. In particular, conventional permissions provide an "all-or-nothing" proposition with regards to the management of a content repository, including the resources contained in the content repository. For example, a user is not able to re-purpose a resource without having write permissions on the same or another resource. Unfortunately, granting the user write permissions in order to allow the user to repurpose a resource also provides the user the ability to compromise the integrity of the resource to which the user is granted write permissions, including the entire content repository. Conversely, granting the user only read permissions and not write permissions, while protecting the integrity of the content repository and the resources contained in the content repository, are too restrictive in that the user is not provided the ability to re-purpose the resources. The challenges associated with protecting the integrity of content repositories, including digital resources contained in the content repositories, are unique to the digital realm. These unique challenges call for solutions that are specifically tailored to, and that are compatible with, existing content repositories and the digital resources contained in the content repositories.

To this end, disclosed herein is an access permission framework that helps protect the integrity of digital resources while still allowing users without conventional read and write permissions to re-purpose those resources. In some embodiments, the access permission framework helps to protect the integrity by providing a set of enhanced permissions, a set of primitive operations to re-purpose resources, and an access permission management system for a content repository. In some embodiments, the enhanced permissions include a "copy" permission, a "cut" permission, and a "paste" permission, and the set of primitive operations includes a "copy" operation and a "move" operation. When executing a primitive operation, the access permission management system ensures that the appropriate enhanced permissions are in place to perform the primitive operation in the content repository.

The enhanced permissions determine the ability for a user to re-purpose resources without having conventional read and write permissions on the resources. The enhanced permissions do not provide the user the ability to read or alter the contents of the resources. The ability to read or alter the contents of the resources is provided by the conventional read and write permissions. Rather, the enhanced permissions work in pairs to provide the user the ability to re-purpose resources without having the ability to read or alter the contents of the resources, thus maintaining the integrity of the resources. For example, a copy permission and paste permission pair provides the ability to copy a resource from a first location to a second location by creating a copy of the resource in the first location and pasting the copy of the resource to the second location. That is, the copy permission working in conjunction with the paste permission provide the ability to copy and paste a resource from an original location to a target location, without impacting the resource in the original location. Likewise, a cut permission and paste permission pair provides the ability to move a resource from a first location to a second location by cutting the resource from the first location and pasting the cut resource in the second location. That is, the cut permission working in conjunction with the paste permission provide the ability to cut and paste a resource from an original location to a target location, and delete the resource in the original location.

As used herein, the term "copy permission" refers to a permission that specifies the ability to identify or indicate a resource in performing a copy of the resource. The copy permission is distinct from the conventional read and write permissions in that, the copy permission does not provide the ability to open the resource, or read or alter the contents of the resource. The copy permission specified for a file in a content repository does not provide the ability to read or alter the contents of the file. When specified for a folder, the copy permission provides the ability to identify or indicate the folder, as well as the files in the folder (e.g., indicate the names of the files in the folder), but does not provide the ability to read or alter the contents of the folder or the contents of the files in the folder. The copy permission operates as a "marker" to the resource in that it provides the ability to "locate" or "identify" the resource, for example, when performing a copy (e.g., copy and paste) operation. In some embodiments, the copy permission supports a permission identifier ("permId") parameter, whose value is a unique identifier. The permission identifier value is generated by the system, and may be used to couple the copy permission to a corresponding paste permission, as will be further described below.

As used herein, the term "cut permission" refers to a permission that specifies the ability to identify or indicate a resource in performing a move of the resource. Similar to the copy permission, the cut permission is distinct from the conventional read and write permissions in that, the cut permission does not provide the ability to open the resource, or read or alter the contents of the resource. The cut permission specified for a file in a content repository does not provide the ability to read or alter the contents of the file. When specified for a folder, the cut permission provides the ability to identify or indicate the folder, as well as the files in the folder (e.g., indicate the names of the files in the folder), but does not provide the ability to read or alter the contents of the folder or the contents of the files in the folder. The cut permission operates as a "marker" to the resource in that it provides the ability to "locate" or "identify" the resource, for example, when performing a move (e.g., cut and paste) operation. In some embodiments, the cut permission supports a permission identifier ("permId") parameter, whose value is a unique identifier. The permission identifier value is generated by the system, and may be used to couple the cut permission to a corresponding paste permission, as will be further described below.

As used herein, the term "paste permission" refers to a permission that specifies the ability to create an instance of an existing resource. The paste permission specifies the ability to copy or move a resource at a namespace (e.g., a path or location in a content repository). Operating in conjunction with the copy permission or the cut permission, the paste permission specified for a folder, such as a target path (e.g., resulting or target location), in a content repository provides the ability to create in the folder an instance of an existing resource. The paste permission is distinct from the conventional read or write permissions in that, the paste permission does not provide the ability to open the resource in order to read the contents of the resource, including the contents of the pasted resources. The paste permission also does not provide the ability to create an instance of a new, non-existing resource. The paste permission specifies the ability to use or re-purpose resources even without the conventional read or write permissions on the resources. In conjunction with the copy permission or the cut permission, the paste permission specified for a target path specifies a permission to re-purpose an existing resource by creating an instance of the existing resource in the target path, and using the instance of the existing resource in the target path. In some embodiments, the paste permission supports a permission identifier ("permId") parameter, whose value is a unique identifier. The permission identifier value is generated by the system, and may be used to couple the paste permission to a corresponding copy permission or to a corresponding cut permission. In an example use case of the permission identifier, in a copy and paste operation or a cut and paste operation, a permission identifier of the paste permission is compared with a permission identifier of a corresponding copy permission or a corresponding cut permission, and the paste operation succeeds if the permission identifiers match. Otherwise, the copy and paste operation or the cut and paste operation fails (e.g., is not permitted) if the permission identifiers do not match. Accordingly, the permission identifiers provide for a tight coupling of the copy permission or the cut permission and the paste permission.

In some embodiments, a copy, cut, and paste permission may have the following example forms:

allow user permission[permId=value]/a/b/c deny user permission[permId=value]/a/b/c In the permission examples above, "allow" is a grant of the specified permission, and "deny" is a denial of the specified permission. "User" specifies a trustee to whom the specified permission is being granted or denied. The trustee may be a user account, a group account, or a logon session to which the specified permission applies. A user account includes an account that a human user or a program (e.g., an application program) uses to logon to a computing system. The trustee may be identified using a unique identifier. "Permission" specifies the permission, for example, copy, cut, or paste, that is being granted or denied. "permId" is the permission identifier associated with the permission. As described above, the value of the permId is generated by the access permission management system, and permId is used to couple the permissions, for example, couple a copy permission with a paste permission, or couple a cut permission with a paste permission. In some cases, for example, in the case of the content repository being a file system, the value of the permId may be generated by an operating system access control module. The permission identifier, permId, may be set to a wildcard character, such as an asterisk ("*"), which can be interpreted as any value. Thus, a permId set to the wildcard character will match any permId value. "a/b/c" identifies a resource to which the specified permission is specified (e.g., a resource to which the specified permission attaches). In some embodiments, the resource is identified using a universally unique identifier (UUID). In a content repository, the identified resource may be a path in the content repository, and the path may identify, for example, a file or folder in the instance of a copy permission or a cut permission, or a folder in the instance of a paste permission. A path may be specified to be the root of the content repository. Specifying the path to be the root implies that the permission is specified for the entire content repository. Similarly, a trustee may be specified to be a user group that includes one or more users.

In an example use case of the permission identifier in the example permission forms described above, a system administrator may specify the following permission [1] and permission [2] that apply to a user, whose system identity (e.g., user account identity or group account identity) is "author":

allow author copy[permId=uuid1]/a/b/c      [1]

allow author paste[permId=uuid1]/x/y/z      [2]

Permission [1] grants author permission to copy from a resource /a/b/c. Since permission [1] is a grant of a permission to copy a resource (e.g., file) or from a resource (e.g., a folder), permission [1] is a source permission and resource /a/b/c is a source path. Permission [2] grants author permission to paste to a resource /x/y/z. Since permission [2] is a grant of a permission to paste to a resource (e.g., folder), permission [2] is a target permission and resource /x/y/z is a target path. Since the permId (value of the permId) of the granted copy permission matches the permId (value of the permId) of the granted paste permission, the granted copy permission couples to the granted paste permission. Accordingly, based on permission [1] and permission [2], author is granted permission to copy from resource /a/b/c to resource /x/y/z without having write permissions on resource /x/y/z. That is, based on permission [1] and permission [2], author is able to copy from resource /a/b/c and paste to resource /x/y/z, even though author is not able to modify resource /x/y/z (e.g., create resources in /x/y/z). In the instance resource /a/b/c specifies a file in the content repository, author is granted permission to copy resource /a/b/c to resource /x/y/z. In the instance resource /a/b/c specifies a folder in the content repository, author is granted permission to copy a file or files from resource /a/b/c to resource /x/y/z.

In another example use case of the permission identifier in the example permission forms described above, a system administrator may specify the following permission [3] and permission [4] that apply to a user, whose system identity (e.g., user account identity or group account identity) is "author":

allow author copy[permId=uuid1]/a/b/c      [3]

allow author paste[permId=uuid2]/x/y/z      [4]

Permission [3] grants author permission to copy from a resource /a/b/c. Since permission [3] is a grant of a permission to copy a resource (e.g., file) or from a resource (e.g., a folder), permission [3] is a source permission and resource /a/b/c is a source path. Permission [4] grants author permission to paste to a resource /x/y/z. Since permission [4] is a grant of a permission to paste to a resource (e.g., folder), permission [4] is a target permission and resource /x/y/z is a target path. Since the permId (value of the permId) of the granted copy permission does not match the permId (value of the permId) of the granted paste permission, the granted copy permission does not couple to the granted paste permission. Accordingly, based on permission [3] and permission [4], author is not granted permission to copy from resource /a/b/c to resource /x/y/z. That is, based on permission [3] and permission [4], author is not able to copy from resource /a/b/c and paste to resource /x/y/z.

In still another example use case of the permission identifier in the example permission forms described above, a system administrator may specify the following permission [5] and permission [6] that apply to a user, whose system identity (e.g., user account identity or group account identity) is "author":

allow author cut[permId=uuid1]/a/b/c  [5]

allow author paste[permId=uuid1]/x/y/z  [6]

Permission [5] grants author permission to cut from a resource /a/b/c. Since permission [5] is a grant of a permission to cut a resource (e.g., file) or from a resource (e.g., a folder), permission [5] is a source permission and resource /a/b/c is a source path. Permission [6] grants author permission to paste to a resource /x/y/z. Since permission [6] is a grant of a permission to paste to a resource (e.g., folder), permission [6] is a target permission and resource /x/y/z is a target path. Since the permId (value of the permId) of the granted cut permission matches the permId (value of the permId) of the granted paste permission, the granted cut permission couples to the granted paste permission. Accordingly, based on permission [5] and permission [6], author is granted permission to cut from resource /a/b/c to resource /x/y/z, without having write permission on resource /x/y/z. That is, based on permission [5] and permission [6], author is able to cut from resource /a/b/c and paste to resource /x/y/z, even though author is not able to modify resource /x/y/z (e.g., create resources in /x/y/z). In the instance source path, /a/b/c, specifies a file in the content repository, author is granted permission to cut resource /a/b/c, and paste resource /a/b/c to or in resource /x/y/z. In the instance resource /a/b/c specifies a folder in the content repository, author is granted permission to cut a file or files from or in resource /a/b/c, and paste the cut file or files to or in resource /x/y/z.

In yet another example use case of the permission identifier in the example permission forms described above, a system administrator may specify the following permission [7] and permission [8] that apply to a user, whose system identity (e.g., user account identity or group account identity) is "author":

allow author cut[permId=uuid1]/a/b/c  [7]

allow author paste[permId=uuid2]/x/y/z  [8]

Permission [7] grants author permission to cut from a resource /a/b/c. Since permission [7] is a grant of a permission to cut a resource (e.g., file) or from a resource (e.g., a folder), permission [7] is a source permission and resource /a/b/c is a source path. Permission [8] grants author permission to paste to a resource /x/y/z. Since permission [8] is a grant of a permission to paste to a resource (e.g., folder), permission [8] is a target permission and resource /x/y/z is a target path. Since the permId (value of the permId) of the granted cut permission does not match the permId (value of the permId) of the granted paste permission, the granted cut permission does not couple to the granted paste permission. Accordingly, based on permission [7] and permission [8], author is not granted permission to cut from resource /a/b/c to resource /x/y/z. That is, based on permission [7] and permission [8], author is not able to cut from resource /a/b/c and paste to resource /x/y/z.

A copy operation requires both a copy permission and a paste permission. A copy operation may have the following example form:

copy(userContext, sourcePath, targetPath)

In the example copy operation above, "userContext" specifies a user that is performing the copy operation, "sourcePath" specifies a source path (e.g., original location) of a resource to be copied in a content repository, and "targetPath" specifies a target path (e.g., resulting or target location) in the content repository where the resource is to be copied. The specified user may be a human user that logs on (e.g., logon session) to a computing system, and who is appropriately authenticated by the computing system. Additionally or alternatively, the specified user may be an instance of an executing program (e.g., a process) on a computing system. The instance of the executing program may have associated security attributes, such as a process owner and a set of permissions (e.g., allowable operations). The result of a successful copy operation is that another instance (e.g., a duplicate) of the specified resource is created in the targetPath, and the sourcePath remains unchanged (e.g., the instance of the resource in the original location remains). Accordingly, the copy operation is a non-destructive operation.

A move operation requires both a cut permission and a paste permission. A move operation may have the following form:

move(userContext, sourcePath, targetPath)

In the example move operation above, "userContext" specifies a user that is performing the move operation, "sourcePath" specifies a source path (e.g., original location) of a resource to be moved in a content repository, and "targetPath" specifies a target path (e.g., resulting or target location) in the content repository where the resource is to be moved. The result of a successful move operation is that an instance of the specified resource is created in the targetPath, and the sourcePath is deleted (e.g., the instance of the resource in the original location is deleted). Accordingly, the move operation is a destructive operation in that the sourcePath (resource) is removed from its original location.

The notion of permission inheritance in a content repository is based on the notion of folders and subfolders (or directories and subdirectories). A permission specified for a parent folder is propagated to all child folders of the parent folder (all subfolders below the parent folder). Since each child folder may inherit the permissions from its parent folder, in the instance of a content repository having a hierarchy of three or more levels of folders, the folders, including the files in the folders, deep within the hierarchy may inherit permissions from their parent folder, "grandparent" folder, "great grandparent" folder, and so on.

In some embodiments, the access permission management system evaluates (e.g., resolves) the various permissions based on the following rules:

Deny permission is the default permission, for example, when no permission is specified.

In the instance of conflicting permissions, for example, a deny permission and an allow permission, specified directly for or applied directly to a resource, the permission (ACE) that appears later in the ACL overrides the previous conflicting permission in the ACL. For example, assuming the ACL for a resource includes a deny permission followed by an allow permission. The allow permission overrides the deny permission for the permission granted in the allow permission.

Permissions specified or applied directly to a resource take precedence over permissions inherited from a parent resource.

Permissions inherited from near relatives or predecessors take precedence over permissions inherited from distant relatives or predecessors. For example, permissions inherited from a parent folder take precedence over permissions inherited from a "grandparent" folder, and so on.

Permissions are cumulative. For example, a user granted allow permission to copy resource A and allow permission to cut resource B is allowed to copy resource A and cut resource B.

In some embodiments, a deny copy (or cut) permission specified for a specific child folder of a parent folder applies only to the specific child folder, and to the child folders of the specific child folder. If an allow copy (or cut) permission is specified for the parent folder, the other child folders of the parent folder (i.e., the child folders other than the specific child folder) can still be copied (or cut). However, since copying (or moving) the parent folder means copying (or moving) all child folders of the parent folder, specifying a deny copy (or cut) permission for the specific child folder may lead to a partial copy (or move) operation, which may cause the content repository to be in an inconsistent state.

To address the issue of a potential partial copy (or move) operation, in some embodiments, the copy (or move) operation is implemented as an atomic operation. That is, the copy (or move) operation either succeeds completely or it fails. The atomic nature of the copy (or move) operation ensures that the content repository is always in a consistent state. For example, notwithstanding an allow copy (or cut) permission specified for a parent folder, if a deny copy (or cut) permission is specified for a child folder, a copy (or move) operation of the parent folder will fail. If a user wants to copy only child folders where the user is granted permission to copy (or cut) (e.g., possibly by virtue of an allow copy (or cut) permission specified for the parent folder), then the user needs to invoke a copy (or cut) operation or operations explicitly specifying (e.g., identifying) those child folders.

The disclosed techniques promote the integrity of resources in a manageable manner while extending system services to allow users with insufficient privileges to re-purpose the resources. Numerous configurations and variations will be apparent in light of this disclosure.

Framework

Turning now to the figures, FIG. 1 illustrates an example table 100 showing the permission evaluation of a copy operation, arranged in accordance with at least some embodiments described herein. Table 100 explains the logic of the permission evaluation for the read, write, copy, and paste permissions. As depicted, column 102 lists the access control entries (ACEs) attached to a source path (e.g., an original location from where a resource can be copied). A top header 104 lists the ACEs attached to a target path (e.g., a resulting location where the resource from the original location can be copied to).

As indicated by the permission evaluation results in table 100, a copy operation by a trustee (user) granted a read permission at the source path and a write permission at the target path will be allowed; a read permission at the source path and a paste[permId=*] permission at the target path will be denied; a read permission at the source path and a paste[permId=uuid1] permission at the target path will be denied; a read permission at the source path and a paste[permId=uuid2] permission at the target path will be denied; a copy[permId=*] permission at the source path and a write permission at the target path will be denied; a copy[permId=*] permission at the source path and a paste[permId=*] permission at the target path will be allowed; a copy[permId=*] permission at the source path and a paste[permId=uuid1] permission at the target path will be allowed; a copy[permId=*] permission at the source path and a paste[permId=uuid2] permission at the target path will be allowed; a copy[permId=uuid1] permission at the source path and a write permission at the target path will be denied; a copy[permId=uuid1] permission at the source path and a paste[permId=*] permission at the target path will be allowed; a copy[permId=uuid1] permission at the source path and a paste[permId=uuid1] permission at the target path will be allowed; a copy[permId=uuid1] permission at the source path and a paste[permId=uuid2] permission at the target path will be denied; a copy[permId=uuid2] permission at the source path and a write permission at the target path will be denied; a copy[permId=uuid2] permission at the source path and a paste[permId=*] permission at the target path will be allowed; a copy[permId=uuid2] permission at the source path and a paste[permId=uuid1] permission at the target path will be denied; and a copy[permId=uuid2] permission at the source path and a paste[permId=uuid2] permission at the target path will be allowed. To summarize, a copy operation with only a read permission at the source path without a write permission at the target path will be denied, even if granted paste permissions at the target path. Likewise, a copy operation with a copy permission (e.g., any of the copy permissions) at the source path without a matching paste permission at the target path will be denied, even if granted a write permission at the target path.

Figure 2:
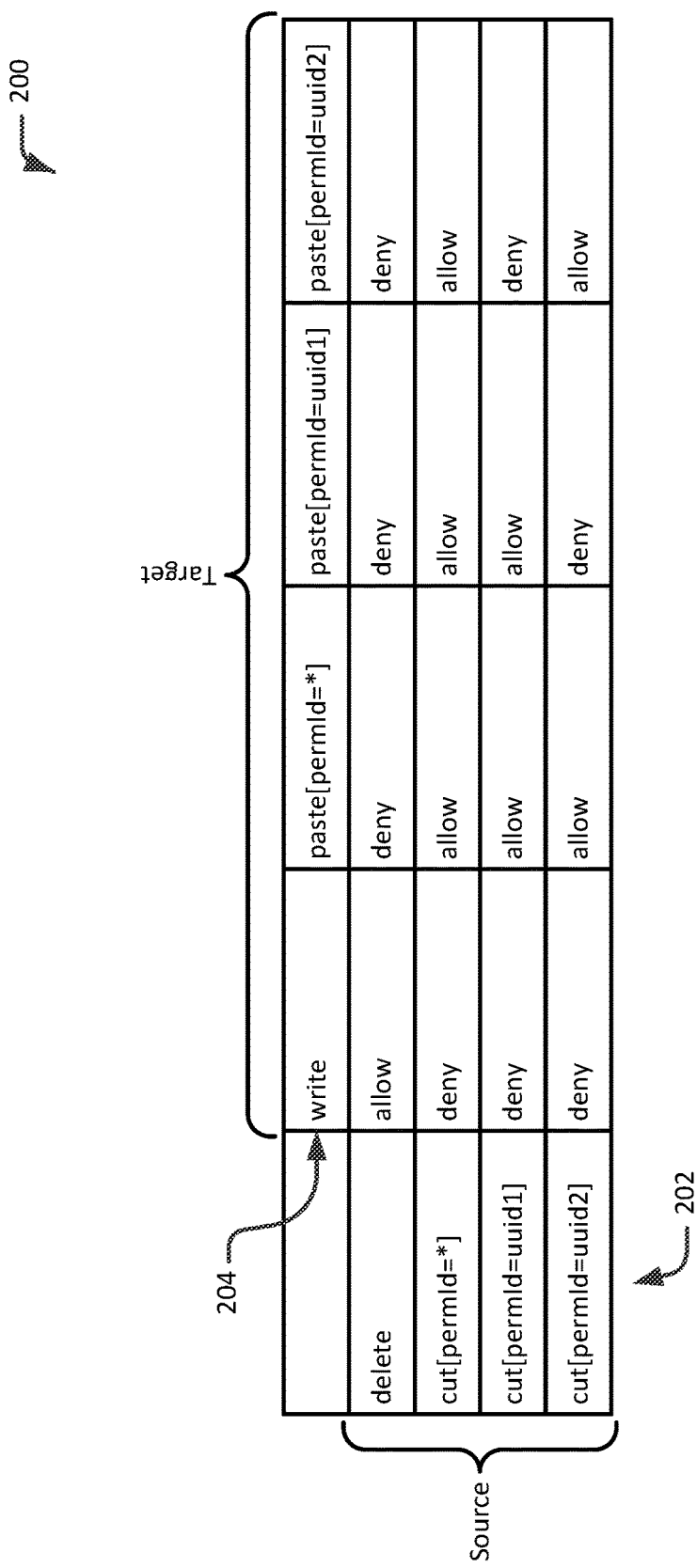
FIG. 2 illustrates an example table showing the permission evaluation of a move operation, arranged in accordance with at least some embodiments described herein.

FIG. 2 illustrates an example table 200 showing the permission evaluation of a move operation, arranged in accordance with at least some embodiments described herein. Table 200 explains the logic of the permission evaluation for the delete, write, cut, and paste permissions. As depicted, column 202 lists the access control entries (ACEs) attached to a source path or location (e.g., an original location from where a resource is to be moved). A top header 204 lists the ACEs attached to a target path or location (e.g., a resulting location where the resource from the original location can be moved to).

As indicated by the permission evaluation results in table 200, a move operation by a trustee (user) granted a delete permission at the source path and a write permission at the target path will be allowed; a delete permission at the source path and a paste[permId=*] permission at the target path will be denied; a delete permission at the source path and a paste[permId=uuid1] permission at the target path will be denied; a delete permission at the source path and a paste[permId=uuid2] permission at the target path will be denied; a cut[permId=*] permission at the source path and a write permission at the target path will be denied; a cut[permId=*] permission at the source path and a paste[permId=*] permission at the target path will be allowed; a cut[permId=*] permission at the source path and a paste[permId=uuid1] permission at the target path will be allowed; a cut[permId=*] permission at the source path and a paste[permId=uuid2] permission at the target path will be allowed; a cut[permId=uuid1] permission at the source path and a write permission at the target path will be denied; a cut[permId=uuid1] permission at the source path and a paste[permId=*] permission at the target path will be allowed; a cut[permId=uuid1] permission at the source path and a paste[permId=uuid1] permission at the target path will be allowed; a cut[permId=uuid1] permission at the source path and a paste[permId=uuid2] permission at the target path will be denied; a cut[permId=uuid2] permission at the source path and a write permission at the target path will be denied; a cut[permId=uuid2] permission at the source path and a paste[permId=*] permission at the target path will be allowed; a cut[permId=uuid2] permission at the source path and a paste[permId=uuid1] permission at the target path will be denied; and a cut[permId=uuid2] permission at the source path and a paste[permId=uuid2] permission at the target path will be allowed. To summarize, a move operation with only a delete permission at the source path without a write permission at the target path will be denied, even if granted paste permissions at the target path. Likewise, a move operation with a cut permission (e.g., any of the cut permissions) at the source path without a matching paste permission at the target path will be denied, even if granted a write permission at the target path.

Figure 3:
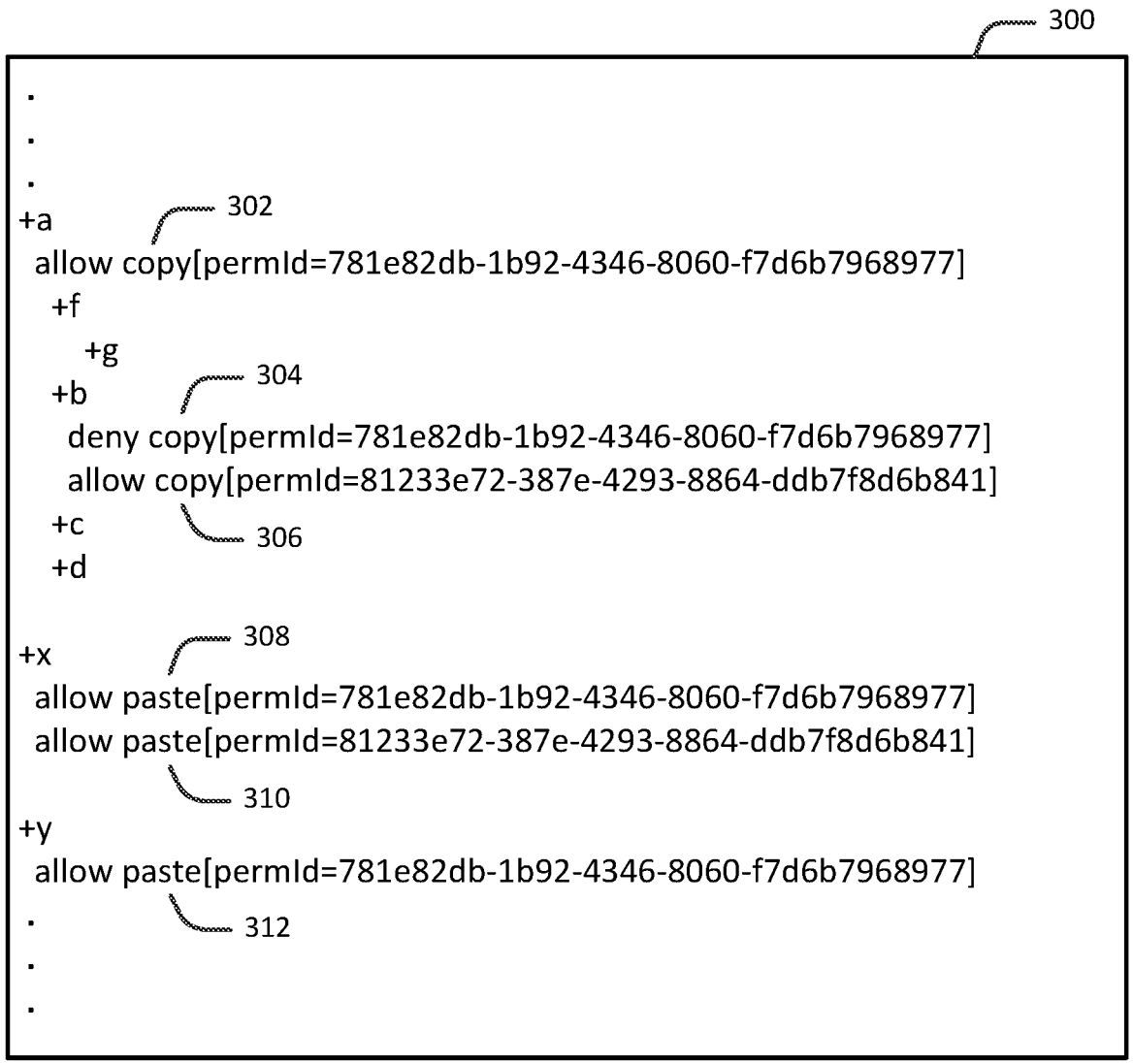
FIG. 3 illustrates an example hierarchical content repository and permissions specified for various levels in the hierarchy, in accordance with at least some embodiments described herein.

FIG. 3 illustrates an example hierarchical content repository 300 and permissions specified for various levels in the hierarchy, in accordance with at least some embodiments described herein. In a hierarchical repository, permissions can be specified for various levels in the hierarchy. That is, a permission can attach to any level in the hierarchy, and a level in the hierarchy can have none, one, or more permissions attached thereto. As depicted, hierarchical content repository 300 includes three hierarchies, "a", "x", and "y". Hierarchy "a" includes four sub-hierarchies, "f", "b", "c", and "d". Sub-hierarchy "f" includes a sub-sub-hierarchy "g". A permission 302, which is a grant of a copy permission having a first permission identifier (781e82db-1b92-4346-8060-f7d6b7968977), is specified for hierarchy "a". A permission 304, which is a denial of a copy permission having the first permission identifier, and a permission 306, which is a grant of a copy permission having a second permission identifier (81233e72-387e-4293-8864-ddb7f8d6b841), are specified for sub-hierarchy "b". A permission 308, which is a grant of a paste permission having the first permission identifier, and a permission 310, which is a grant of a paste permission having the second permission identifier, are specified for hierarchy "x". A permission 312, which is a grant of a paste permission having the first permission identifier, is specified for hierarchy "y".

Based on hierarchical content repository 300 and permissions 302-312, the results of the following example copy operations are as follows:

copy(a, y) operation will be denied because certain sub-hierarchies (specifically, sub-hierarchy "b") of hierarchy "a" have deny copy permission (permission 304) for the same permission identifier (the first permission identifier) as the allow copy permission (permission 302) specified for hierarchy "a".

copy(f, y) operation will be allowed by virtue of the allow copy permission (permission 302) specified for hierarchy "a", the allow paste permission (permission 312) specified for hierarchy "y" having the same permission identifier (the first permission identifier) as the allow copy permission specified for hierarchy "a", and the copy operation explicitly specifying sub-hierarchy "f".

copy(a, x) operation will be allowed by virtue of the allow copy permission (permission 302) specified for sub-hierarchy "a", the allow copy permission (permission 306) specified for sub-hierarchy "b", the allow paste permission (permission 308) specified for hierarchy "x", and the allow paste permission (permission 310) specified for hierarchy "x". Permission 302 and permission 308 have the same permission identifier (the first permission identifier), and, thus, will allow a copy operation from hierarchy "a" to hierarchy "x" in the absence of the deny copy permission (permission 304) specified for sub-hierarchy "b" (refer to the copy(a, y) operation example above). That is, the copy(a, y) operation example above is denied because of not being allowed to copy sub-hierarchy "b". But, unlike the copy(a, y) operation above that is denied because of the deny copy permission (permission 304) specified for sub-hierarchy "b", in the case of the copy(a, x) operation, permission 306 and permission 310 having the same permission identifier (the second permission identifier) remedy the effect of permission 304 for a copy operation from hierarchy "a" to hierarchy "x". That is, the allow copy permission (permission 306) specified for sub-hierarchy "b" and the allow paste permission (permission 310) specified for hierarchy "x", both having the same permission identifier (the second permission identifier) and thus being coupled, allows a copy of sub-hierarchy "b" to hierarchy "x", thus undoing the effect of the deny copy permission (permission 304) specified for sub-hierarchy "b" for a copy operation to hierarchy "x".

copy(b, x) operation will be allowed by virtue of the allow copy permission (permission 306) specified for sub-hierarchy "b" and the allow paste permission (permission 310) specified for hierarchy "x" having the same permission identifier (the second permission identifier) as the allow copy permission specified for sub-hierarchy "b".

Although hierarchical content repository 300 is illustrated in the context of example copy and paste permissions, it will be appreciated in light of this disclosure that similar or different cut permissions as the illustrated copy permissions may be specified for the various levels in the hierarchy. It will also be appreciated in light of this disclosure that, when provided cut permissions similar to the illustrated example copy permissions, the results of move operations similar to the illustrated example copy operations will have the same or similar results as those illustrated above.

Figure 4:
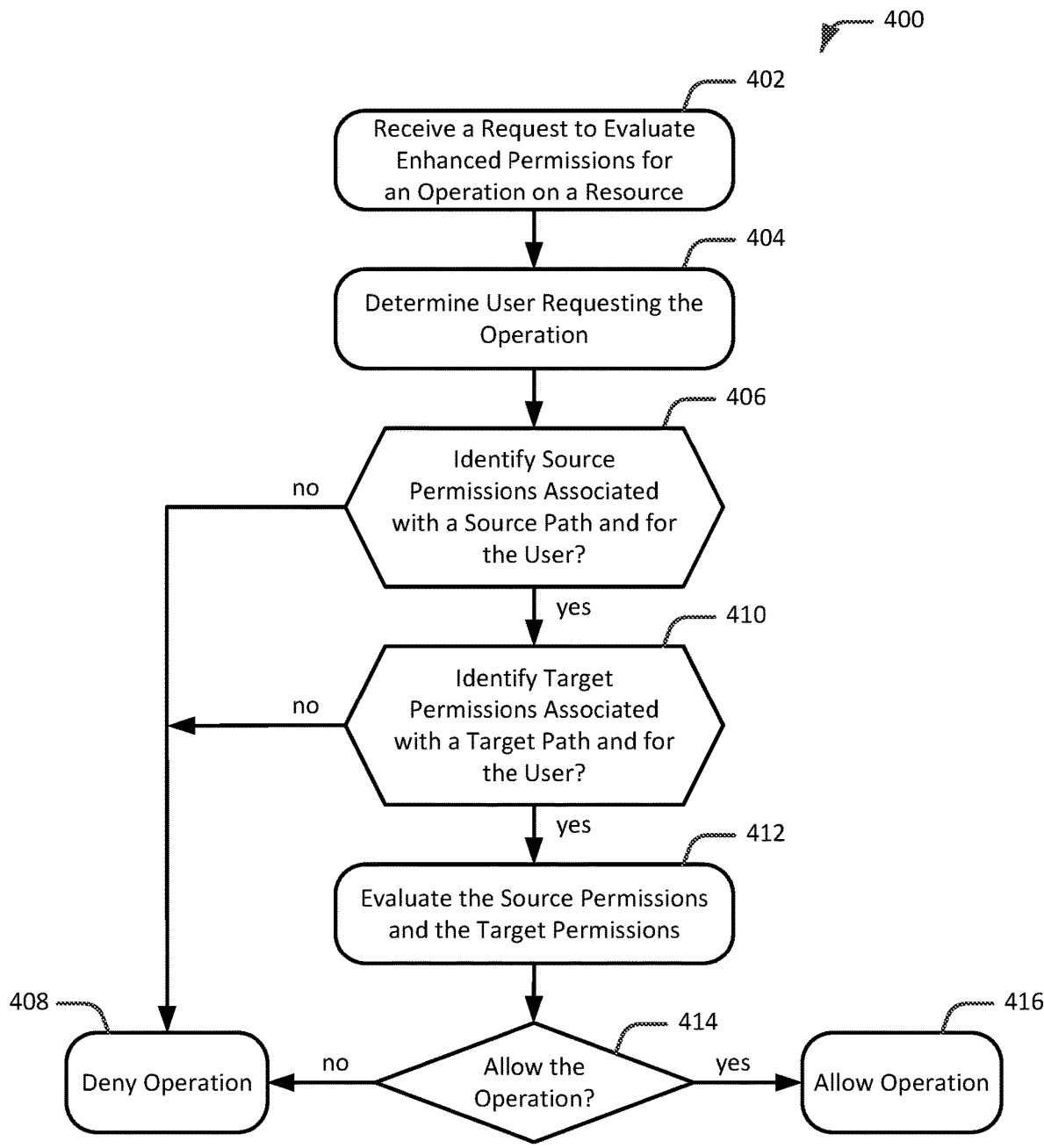
FIG. 4 is a flow diagram illustrating an example method to process enhanced permissions associated with a request to re-purpose resources, in accordance with at least some embodiments described herein.

FIG. 4 is a flow diagram illustrating an example method to process enhanced permissions associated with a request to re-purpose resources, in accordance with at least some embodiments described herein. Example processes and methods may include one or more operations, functions or actions as illustrated by one or more of blocks 402, 404, 406, 408, 410, 412, 414, 416, and/or 418, and may in some embodiments be performed by a computing system such as a computing system 500 of FIG. 5. The operations described in blocks 402-418 may also be stored as computer-executable instructions in a computer-readable medium, such as a memory 504 and/or a data storage 506 of computing system 500. The method may be performed by the access permission management system.

As depicted by flow diagram 400, the process may begin with block 402, where the access permission management system receives a request to evaluate enhanced permissions for an operation on a resource. In an example operation, the operation may be a primitive operation to re-purpose the resource, and the operation may be requested by a user with insufficient conventional permissions, such as read or write permissions, on the resource. In this instance, a permission authorization component of a content repository may determine that the user does not have adequate conventional permissions, and invoke the access permission management system to determine whether the user has sufficient enhanced permissions other than the conventional permissions to perform the operation (e.g., to re-purpose the resource).

Block 402 may be followed by block 404, where the access permission management system determines a user requesting the operation. The user is the requestor of the operation on the resource.

Block 404 may be followed by decision block 406, where the access permission management system determines whether one or more source permissions associated with a source path and for the user are identified. That is, the access permission management system determines whether there is at least one permission specified for the source path that applies to the user. The source path is the identity or the original location of the resource. In some embodiments, the source permission is a copy permission or a cut permission. If the access permission management system determines that no permissions associated with the source path apply to the user, decision block 406 may be followed by block 408, where the access permission management system denies the requested operation. That is, the access permission management system concludes that the user does not have permission to perform the requested operation at least by virtue of not having any enhanced permissions on the source path.

Otherwise, if, at decision block 406, the access permission management system determines that there exists one or more permissions associated with the source path that apply to the user, decision block 406 may be followed by decision block 410, where the access permission management system determines whether one or more target permissions associated with a target path and for the user are identified. That is, the access permission management system determines whether there is at least one permission specified for the target path that applies to the user. The target path is the resulting location of the resource, for example, in the content repository, which results from performing the requested operation. In some embodiments, the target permission is a paste permission. If the access permission management system determines that no permissions associated with the target path apply to the user, decision block 410 may be followed by block 408, where the access permission management system denies the requested operation. That is, the access permission management system concludes that the user does not have permission to perform the requested operation at least by virtue of not having any enhanced permissions on the target path.

Otherwise, if, at decision block 410, the access permission management system determines that there exists one or more permissions associated with the target path that apply to the user, decision block 410 may be followed by block 412, where the access permission management system evaluates the identified source permissions and the identified target permissions.

Block 412 may be followed by decision block 414, where the access permission management system determines whether to allow the requested operation on the resource based on the evaluation of the identified source permissions and the identified target permissions. That is, the access permission management system determines, based on the permissions specified for the source path and the target path and which apply to the user, whether the user has permission to perform the requested operation on the resource. If the access permission management system determines that the requested operation should not be allowed based on the evaluation of the identified source permissions and the identified target permissions, decision block 414 may be followed by block 408, where the access permission management system denies the requested operation. That is, the access permission management system concludes that the user does not have permission to perform the requested operation based on the evaluation of the identified source permissions and the identified target permissions. Otherwise, if the access permission management system determines that the requested operation can be allowed based on the evaluation of the identified source permissions and the identified target permissions, decision block 414 may be followed by block 416, where the access permission management system allows the requested operation. That is, the access permission management system concludes that the user does have permission to perform the requested operation based on the evaluation of the identified source permissions and the identified target permissions.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Figure 5:
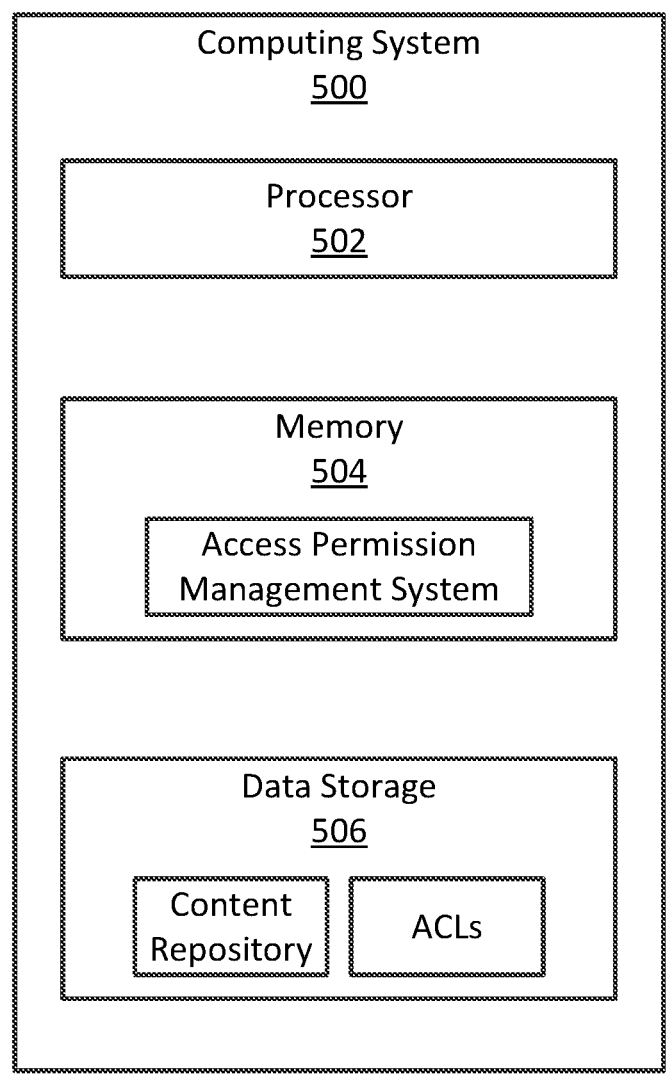
FIG. 5 illustrates selected components of an example computing system that may be used to perform any of the techniques as variously described in the present disclosure, in accordance with at least some embodiments described herein.

FIG. 5 illustrates selected components of example computing system 500 that may be used to perform any of the techniques as variously described in the present disclosure, in accordance with at least some embodiments described herein. In some embodiments, computing system 500 may be configured to implement or direct one or more operations associated with some or all of the engines, components and/or modules associated with the access permission management system. For example, the engines, components and/or modules associated with the access permission management system may be implemented in and/or using computing system 500. In one example case, for instance, the access permission management system is loaded in memory 504 and executable by a processor 502, and the content repository and the access control lists specified for the content repository, including the access control entries, are included in data storage 506. Computing system 500 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 500 may include processor 502, memory 504, and data storage 506. Processor 502, memory 504, and data storage 506 may be communicatively coupled.

In general, processor 502 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, processor 502 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 502 may be configured to interpret and/or execute program instructions and/or process data stored in memory 504, data storage 506, or memory 504 and data storage 506. In some embodiments, processor 502 may fetch program instructions from data storage 506 and load the program instructions in memory 504. After the program instructions are loaded into memory 504, processor 502 may execute the program instructions.

For example, in some embodiments, any one or more of the engines, components and/or modules associated with the access permission management system may be included in data storage 506 as program instructions. Processor 502 may fetch some or all of the program instructions from data storage 506 and may load the fetched program instructions in memory 504. Subsequent to loading the program instructions into memory 504, processor 502 may execute the program instructions such that the computing system may implement the operations as directed by the instructions.

In some embodiments, virtualization may be employed in computing device 500 so that infrastructure and resources in computing device 500 may be shared dynamically. For example, a virtual machine may be provided to handle a process running on multiple processors so that the process appears to be using only one computing resource rather than multiple computing resources. Multiple virtual machines may also be used with one processor.

Memory 504 and data storage 506 may include computer-readable storage media for carrying or having computer-executable instructions or data structures stored thereon. Such computer-readable storage media may include any available media that may be accessed by a general-purpose or special-purpose computer, such as processor 502. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 502 to perform a certain operation or group of operations.

Modifications, additions, or omissions may be made to computing system 500 without departing from the scope of the present disclosure. For example, in some embodiments, computing system 500 may include any number of other components that may not be explicitly illustrated or described herein.

As indicated above, the embodiments described in the present disclosure may include the use of a special purpose or a general purpose computer (e.g., processor 502 of FIG. 5) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 504 of FIG. 5) for carrying or having computer-executable instructions or data structures stored thereon.

Numerous example variations and configurations will be apparent in light of this disclosure. According to some examples, computer-implemented methods to evaluate enhanced permissions for re-purposing of a resource are described. An example computer-implemented method may include: receiving a request to evaluate enhanced permissions for an operation on a resource, the operation having associated therewith a user, a source path, and a target path; identifying one or more source permissions specified for the source path and that apply to the user; identifying one or more target permissions specified for the target path and that apply to the user, the target permissions being paste permissions; evaluating the identified one or more source permissions and the identified one or more target permissions; and determining whether to allow the operation based on the evaluating the identified one or more source permissions and the identified one or more target permissions.

In some examples, at least one of the one or more source permissions is a copy permission. In other examples, at least one of the one or more source permissions is a cut permission. In still other examples, the source permissions do not grant read permission to the source path. In yet other examples, the target permissions do not grant read permission to the target path. In further examples, the target permissions do not grant write permission to the target path. In still further examples, each source permission of the one or more source permissions includes a source permission identifier, and wherein each target permission of the one or more target permissions includes a target permission identifier. In yet further examples, the evaluating the identified one or more source permissions and the identified one or more target permissions includes matching the source permission identifier and the target permission identifier.

According to some examples, computer program products including one or more non-transitory machine readable mediums encoded with instructions that when executed by one or more processors cause a process to evaluate enhanced permissions for re-purposing of a resource to be carried out are described. An example process may include: receiving a request to evaluate enhanced permissions for an operation on a resource, the operation having associated therewith a user, a source path, and a target path; identifying one or more source permissions specified for the source path and that apply to the user; identifying one or more target permissions specified for the target path and that apply to the user, the target permissions being paste permissions; evaluating the identified one or more source permissions and the identified one or more target permissions; and determining whether to allow the operation based on the evaluating the identified one or more source permissions and the identified one or more target permissions.

In some examples, at least one of the one or more source permissions is one of a copy permission and a cut permission. In other examples, the source permissions do not grant read permission to the source path. In still other examples, the target permissions do not grant read permission to the target path. In yet other examples, the target permissions do not grant write permission to the target path. In further examples, each source permission of the one or more source permissions includes a source permission identifier, and wherein each target permission of the one or more target permissions includes a target permission identifier. In still further examples, the evaluating the identified one or more source permissions and the identified one or more target permissions includes matching the source permission identifier and the target permission identifier.

According to some examples, systems to evaluate enhanced permissions for re-purpose of a resource are described. An example system may include: one or more non-transitory machine readable mediums configured to store instructions; and one or more processors configured to execute the instructions stored on the one or more non-transitory machine readable mediums. Execution of the instructions by the one or more processors may cause the one or more processors to: receive a request to evaluate enhanced permissions for an operation on a resource, the operation having associated therewith a user, a source path, and a target path; identify one or more source permissions specified for the source path and that apply to the user; identify one or more target permissions specified for the target path and that apply to the user, the target permissions being paste permissions; evaluate the identified one or more source permissions and the identified one or more target permissions; and determine whether to allow the operation based on the evaluating the identified one or more source permissions and the identified one or more target permissions.

In some examples, at least one of the one or more source permissions is one of a copy permission and a cut permission. In other examples, the source permissions do not grant read permission to the source path. In still other examples, the target permissions do not grant at least one of read permission to the target path and write permissions to the target path. In yet other examples, to evaluate the identified one or more source permissions and the identified one or more target permissions includes match source permission identifiers associated with the one or more source permissions and target permission identifiers associated with the one or more target permissions.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to evaluate enhanced permissions for re-purposing of a resource, the method comprising:
   receiving a request to perform an operation on a resource, the operation having associated therewith a user, a source path, and a target path;
   identifying a source permission that is specified for the source path, and that applies to the user, wherein the source permission includes a source permission identifier value;
   identifying a target permission that is specified for the target path, and that applies to the user, wherein the target permission includes a target permission identifier value;
   making a determination that the source permission identifier value matches the target permission identifier value; and
   in response to making the determination, allowing the operation to be performed on the resource.

2. The method of claim 1, wherein the source permission is a copy permission.

3. The method of claim 1, wherein the source permission is a cut permission.

4. The method of claim 1, wherein the source permission does not grant read permission to the source path.

5. The method of claim 1, wherein the target permission does not grant read permission to the target path.

6. The method of claim 1, wherein the target permission does not grant write permission to the target path.

7. The method of claim 1, further comprising, before receiving the request, receiving a command that grants the user the source and target permissions.

8. The method of claim 1, further comprising:
    before receiving the request, receiving a command that grants the user the source and target permissions; and
    in response to receiving the command, generating the source and target permission identifier values that are included in the respective source and target permissions, wherein the source and target permission identifier values are identical.

9. A computer program product including one or more non-transitory machine readable mediums encoded with instructions that when executed by one or more processors cause a process to evaluate enhanced permissions for re-purposing of a resource to be carried out, the process comprising:
    receiving a request to perform an operation on a resource, the operation having associated therewith a user, a source path, and a target path;
    identifying a source permission that is specified for the source path, and that applies to the user, wherein the source permission includes a source permission identifier value;
    identifying a target permission that is specified for the target path, and that applies to the user, wherein the target permission includes a target permission identifier value;
    making a determination that the source permission identifier value matches the target permission identifier value; and
    in response to making the determination, allowing the operation to be performed on the resource.

10. The computer program product of claim 9, wherein the source permission is selected from a group consisting of a copy permission and a cut permission.

11. The computer program product of claim 9, wherein the source permission does not grant read permission to the source path.

12. The computer program product of claim 9, wherein the target permission does not grant read permission to the target path.

13. The computer program product of claim 9, wherein the target permission does not grant write permission to the target path.

14. The computer program product of claim 9, wherein the process further comprises, before receiving the request, receiving a command that grants the user the source and target permissions.

15. The computer program product of claim 9, wherein process further comprises:
    before receiving the request, receiving a command that grants the user the source and target permissions; and
    in response to receiving the command, generating the source and target permission identifier values that are included in the respective source and target permissions, wherein the source and target permission identifier values are identical.

16. A system to evaluate enhanced permissions for re-purpose of a resource, the system comprising:
    one or more non-transitory machine readable mediums configured to store instructions; and
    one or more processors configured to execute the instructions stored on the one or more non-transitory machine readable mediums, wherein execution of the instructions causes the one or more processors to
    receive a request to perform an operation on a resource, the operation having associated therewith a user, a source path, and a target path,
    identify a source permission that is specified for the source path, and that applies to the user, wherein the source permission includes a source permission identifier value;
    identify a target permission that is specified for the target path, and that applies to the user, wherein the target permission includes a target permission identifier value;
    make a determination that the source permission identifier value matches the target permission identifier value, and
    in response to making the determination, allow the operation to be performed on the resource.

17. The system of claim 16, wherein the source permission is selected from a group consisting of a copy permission and a cut permission.

18. The system of claim 16, wherein the source permission does not grant read permission to the source path.

19. The system of claim 16, wherein the target permission does not grant at least one of read permission to the target path and write permissions to the target path.

20. The system of claim 16, wherein execution of the instructions further causes the one or more processors to:
    before receiving the request, receive a command that grants the user the source and target permissions; and
    in response to receiving the command, generate the source and target permission identifier values that are included in the respective source and target permissions, wherein the source and target permission identifier values are identical.

* * * * *